United States Patent

[11] 3,617,224

| [72] | Inventors | Avgust Rafaelevich Brun-Tsekhovoi<br>Ulitsa Garibaldi 21, Dorpus 3. kv. 32, Moscow;<br>Valery Fedorovich Varnavsky, Ulitsa Zhigulevskaya, 16, Dnepropetrovsk;<br>Anatoly Markovich Glukhomanjuk, Ulitsa Zhelyabova, 10, kv. 88, Kiev; Vasily Gavrilovich Kulbachny, Ulitsa Kirova, 9, ku. 55, Kiev, all of U.S.S.R. |
|---|---|---|
| [21] | Appl. No. | 806,943 |
| [22] | Filed | Mar. 13, 1969 |
| [45] | Patented | Nov. 2, 1971 |
| [32] | Priority | Mar. 18, 1968 |
| [33] | | U.S.S.R. |
| [31] | | 1225841 |

[54] GAS DISTRIBUTION GRID
7 Claims, 4 Drawing Figs.

[52] U.S. Cl. .................................................... 23/284,
23/1 R, 23/277 R, 23/252 R, 34/57 A, 239/403, 239/553, 239/558, 431/354, 431/187, 23/288 S
[51] Int. Cl. .................................................... B01j 9/14
[50] Field of Search .......................................... 23/277, 284, 288.3 S, 252; 431/354, 187; 239/403, 402, 399, 433, 553, 557, 558; 34/57 A, 10

[56] References Cited
UNITED STATES PATENTS

| 2,715,648 | 8/1955 | Sachsse et al. | 23/284 X |
| 2,729,428 | 1/1956 | Milmore | 34/57 A X |
| 2,970,178 | 1/1961 | Braconier et al. | 23/277 U X |
| 3,215,508 | 11/1965 | Piester | 23/284 X |

Primary Examiner—James H. Tayman, Jr
Attorney—Waters, Roditi, Schwartz & Nissen

ABSTRACT: A gas distribution grid for feeding a mixture of combustible and oxidizing gas into a layer of solid granular material, both under atmospheric and elevated pressure, comprising a housing, partitions with mixing pipes built therein, and tubes for the supply of combustible and oxidizing gas to spaces of the grid insulated from each other and defined by said partitions and the grid housing.

The mixing pipes are provided with inserts whereby a linear velocity of the gaseous mixture flow exceeding that of the flame propagation in the mixture is attained in the channels of the mixing pipes feeding the gaseous mixture to the layer of material. This helps preclude the combustion of the mixture in the mixing pipes and in said grip spaces. The gas distribution grid according to the present invention can be used both in the presence of a continuous movement of the solid granular material through the apparatus in which the grid is incorporated and in the absence of such movement.

PATENTED NOV 2 1971  3,617,224

GAS DISTRIBUTION GRID

The present invention relates to devices for effecting mass exchange processes between gases and granular solid materials in such cases when the initial mixture of gases comprises a combustible component and an oxidizing agent, and relates particularly to the construction of gas distribution grids.

The gas distribution grid proposed herein will prove most advantageous for combusting gases in a fluidized bed of solid granular materials and for running various oxidation reactions.

Known in the art are gas distribution grids for effecting mass exchange processes in a fluidized bed of a solid granular material (see, for example, U.S. Pat. No. 2,934,411), such grids comprising partitions arranged transversely to the direction of the flow of gases flowing through the apparatus with pipes built thereinto for the gases to pass.

Fed into the space under the gas distribution grid on which a layer of solid granular material is disposed, is a mixture of combustible and oxidizing gases.

The presence of the combustible gaseous mixture under the gas distribution grid involves the danger of the mixture combustion and resulting in the failure of the entire apparatus.

Also known are constructions of gas distribution grids, wherein with a view to precluding the hazard of the combustible mixture inflammation within the space under the grid, provision is made for feeding separately the combustible gas and the oxidizing gas into the layer of granular solid material through separate pipes, whereupon the gaseous components are mixed in said layer (see, for example, U.S. Pat. No. 3,215,508).

In such a case, however, the gaseous components are mixed in the layer of the granular material nonuniformly which adversely affects the subsequent contact of the phases.

The object of the present invention is to provide such a construction of the gas distribution grid that would ensure the feeding into the layer of solid granular material of a ready gaseous mixture and that would at the same time preclude the hazard of the mixture being combusted within the space under the gas distribution grid.

Said object is accomplished due to the provision of a gas distribution grid for feeding gases into the layer of solid granular material, said grid comprising partitions with built-in mixing pipes directed transversely to the direction of the flow of the mixture of gases, wherein the mixing pipes are made so that the combustible gas and the oxidizing gas are fed separately thereto and are then mixed therein.

The present gas distribution grid may comprise three partitions that define two closed spaces, into one of which spaces combustible gas is supplied, and into the other space, oxidizing gas, while mixing pipes arranged in the partitions communicate with each of said spaces.

It is desirable that the mixing pipes be provided with inserts so that a gap is formed between the inserts and the walls of the pipes, said gap communicating with one of said spaces of the gas distribution grid through a channel in the insert, and with the other space through perforations in the walls of the mixing pipe.

The mixing pipes may be provided with inserts contiguous to the pipe walls with grooves on the insert surfaces adjoining the pipe walls for the passage of the gaseous mixture, said grooves communicating with one of the spaces of the gas distribution grid through a channel in the insert, and with the other space through perforations in the walls of the mixing pipe.

It is expedient that the grooves of the inserts be arranged helically. In what follows the nature of the present invention is explained in the disclosure of its exemplary embodiment given by of illustration to be had in conjunction with the accompanying drawings, wherein:

FIG. 1 diagrammatically represents the gas distribution grid of the invention in section with one mixing pipe shown purposely;

Figure 1:
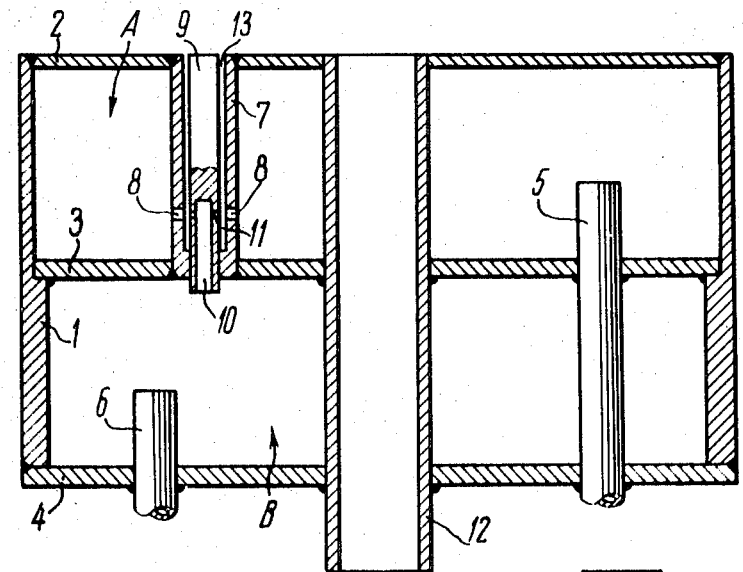
Figure 4:

FIG. 4 shows an insert with helical groove according to the invention, taken on an enlarged scale. Reference being now made to the FIG. 1, the gas distribution grid of the invention comprises a housing 1 provided with partitions 2, 3 and 4, the ones indicated at 2 and 3 forming a closed space A to contain the combustible gas, while the partitions 3 and 4 form another closed space B to accommodate the oxidizing gas.

A tube 5 runs into the space A and a tube 6, into the space B. Arranged between the partitions 2 and 3 are mixing pipes 7 provided in their bottom portion with radial holes 8 through which holes the bore of the pipe 7 is free to communicate with the space A. Inserts 9 are either thread-fitted or welded into the said pipes, a channel 10 being provided in the bottom portion of said inserts to communicate the bore of the pipe 7 with the space B via holes 11.

The aforementioned holes 8 and 11 are arranged oppositely with respect to each other.

The gas distribution grid can be used for operation under conditions of a fixed charge of the solid granular material, as well as for operation under conditions of a continuous supply and removal of said material into and from the layer (for example, continuous heating of solid material). In this latter case, the solid granular material is removed from the apparatus in which the grid is incorporated by means of an overflow pipe 12 arranged in the center of the grid in parallel relationship with the mixing pipes 7 and passing through the partitions 2, 3 and 4.

Inserts fitted into the mixing pipes 7 may have various configurations in dependence with the operating conditions of the apparatus wherein the present gas distribution grid is accommodated. When the apparatus is to operate at an atmospheric pressure or at a pressure slightly in excess thereof, use is made of the inserts 9 having a smooth external surface thereof and fitted inside the pipe 9 with a gap, whereby an annulus 13 gets formed in between the walls of the pipe 7 and the surface of the insert 9.

Figure 2:
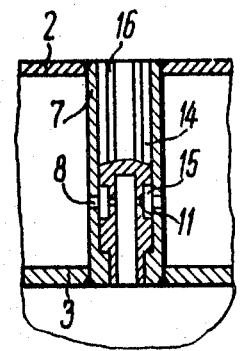
FIG. 2 shows an embodiment of the mixing pipe of the gas distribution grid with an insert having a groove according to the invention.
Figure 3:
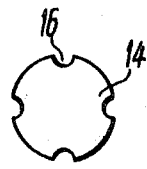
FIG. 3 shows a top view of the insert shown in FIG. 2.

With the apparatus operated at an excess pressure (5 atm. gauge and over), use is made of the inserts illustrated in FIGS. 2 and 4. An insert 14 (FIG. 2) features a circular groove 15 made at the level of the holes 8 in the pipe 7, and is tightly fitted into the mixing pipe 7. The external surface of the insert 14 is provided with longitudinal grooves 16 (FIG. 2, 3) communicating the inner space of the circular groove 15 with the space above the gas distribution grid. An insert 17 (FIG. 4) with helical grooves 18 can be employed to increase the effective path wherealong the gaseous components are free to mix.

The gas distribution grid of the invention operates as follows.

The combustible gas is fed through the tube 5 (FIG. 1) into the space A which gas flows through the holes 8 in the mixing pipe 7 into the annulus 13. Concurrently the oxidizing gas is supplied through the tube 6 into the space B, said gas in turn flowing through the channel 10 and the holes 11 into the annulus 13 as well. Thus the mixing of the both gases occurs in the annulus 13. Then the gaseous mixture so obtained, passes from the annulus 13 into the layer of the granular material arranged on the gas distribution grid and it is on said grid that the gaseous mixture burns up.

When the inserts 14 (FIG. 2) and 17 (FIG. 4) are used, the gaseous mixture is formed in the channels defined by the walls of the mixing pipe 7 and the surfaces of the grooves 16 (FIG. 2) or of the grooves 18 (FIG. 4).

The sizes of these grooves and of the annulus 13 (FIG. 1) are so selected that at a preset operating conditions of the apparatus the velocity of flow of the gaseous mixture along said grooves or said annulus, is in excess of the flame propagation velocity which fact precludes the flame from getting into the pipes 7.

Thus the absence of the inflammable gaseous mixture within the space of the gas distribution grid, as well as eliminating the possibility for the flame to get through the mixing pipes 7 increases the reliability of operation of the gas distribution grid and adds considerably to its service life.

We claim

1. A gas distribution grid for feeding a mixture of combustible and oxidizing gases into a layer of solid granular material without the combustion of said mixture prior to being fed into the layer, comprising: a housing; said housing including at least three partitions arranged transversely to the direction of flow of said gas mixture and defining two closed spaces, one of the outer partitions being adapted to accommodate thereon said layer of granular material; a tube for supplying said combustible gas to one of said closed spaces; a tube for supplying said oxidizing gas to the other of said closed spaces; mixing pipes secured between the middle one of said partitions and said outer partitions adapted to accommodate thereon the layer of solid granular material, said mixing pipes communicating with both of said closed spaces; inserts arranged in said mixing pipes so as to form conduits between the walls of said pipes and said inserts in which said oxidizing and combustible gases are mixed and wherein said conduits communicate with the zone of said layer of solid granular material, the size of said conduits being selected whereby at preset operating conditions the velocity of flow of said gas mixture therethrough exceeds the velocity of flame propagation in said mixture.

2. A gas distribution grid as claimed in claim 1, wherein the length of said inserts is equal to the length of said mixing pipes.

3. A gas distribution grid as claimed in claim 1, wherein the closed space adjoining said layer of solid granular material communicates with said conduits through holes provided in the wall of said mixing pipe.

4. A gas distribution grid as claimed in claim 3, wherein the other of said closed spaces communicates with said conduits through an axial bore extending through the body of said insert and connected to radial bores provided in the insert.

5. A gas distribution grid as claimed in claim 4, wherein each of said conduits has a cross-sectional shape of an annulus, said radial bores in the insert being positioned opposite to said holes in the wall of the mixing pipe.

6. A gas distribution grid as claimed in claim 4, wherein said insert is fitted to the inner surface of said mixing pipe and includes on its outer surface longitudinal grooves forming conduits in conjunction with the walls of said mixing pipe, said conduits being adapted to communicate with said closed spaces through at least one circular groove formed on the exterior of said insert at the level of said holes in the mixing pipe and said radial bores in the insert.

7. A gas distribution grid as claimed in claim 6, wherein said conduits formed by said inserts with the inner surface of said mixing pipes are in the shape of spiral grooves.

* * * * *